US006802024B2

(12) United States Patent
Unice (10) Patent No.: US 6,802,024 B2
(45) Date of Patent: Oct. 5, 2004

(54) DETERMINISTIC PREEMPTION POINTS IN OPERATING SYSTEM EXECUTION

(75) Inventor: Warren Kyle Unice, Sandy, UT (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 10/021,849

(22) Filed: Dec. 13, 2001

(65) Prior Publication Data

US 2003/0115505 A1 Jun. 19, 2003

(51) Int. Cl.[7] .............................................. G06F 11/00
(52) U.S. Cl. ............................ 714/12; 714/11; 714/15
(58) Field of Search .............................. 714/11, 12, 15

(56) References Cited

U.S. PATENT DOCUMENTS

| 5,157,663 | A | | 10/1992 | Major et al. | |
|---|---|---|---|---|---|
| 5,455,932 | A | | 10/1995 | Major et al. | |
| 5,819,021 | A | * | 10/1998 | Stanfill et al. | 714/15 |
| 5,884,021 | A | * | 3/1999 | Hirayama et al. | 714/13 |
| 6,757,847 | B1 | * | 6/2004 | Farkash et al. | 714/39 |
| 2003/0037317 | A1 | * | 2/2003 | Emberson | 717/129 |

OTHER PUBLICATIONS

Samadzadeh, M. H, "Hardware/Software Cost Analysis of Interrupt Processing Strategies" IEEE 2001.*

* cited by examiner

Primary Examiner—Robert Beausoliel
Assistant Examiner—Bryce P. Bonzo
(74) Attorney, Agent, or Firm—Blakely, Sokoloff, Taylor & Zafman LLP (57) ABSTRACT

The present invention, which may be implemented on a general-purpose digital computer, includes methods and apparatus to provide fault-tolerant solutions utilizing single or multiple processors having support for cycle counter functionality. In an embodiment, an apparatus for provision of a fault-tolerant system is disclosed. The apparatus includes a primary system utilizing a primary cycle counter and an operating system capable of preemptive multi-processing; a secondary system utilizing a secondary cycle counter and an operating system capable of preemptive multi-processing; a communication link coupling the primary and secondary systems to enable inter-system communication; and an output facility to provide system output only from the secondary system if only the first interrupt has occurred and the first interrupt was caused by the secondary system.

35 Claims, 8 Drawing Sheets

DETERMINISTIC PREEMPTION POINTS IN OPERATING SYSTEM EXECUTION

FIELD OF INVENTION

The subject of this application relates generally to the field of operating systems and, more particularly, to fault-tolerant computer systems and methods utilizing single or multiple processors.

BACKGROUND OF INVENTION

As our reliance on the Internet and in general computing resources increases, it becomes imperative to provide uninterruptible computer services to computer users. One way to ensure uninterruptible service is to provide hardware replication to avoid problems associated with hardware failure.

A common hardware utilized in provision of computer services is a central processing unit (CPU). CPUs are continuously becoming more powerful than other parts of a computer system (such as memory). Currently, most CPUs spend a lot of time waiting for memory and other interfaces. To provide a more efficient utilization of processing resources, a technique called multithreading is quickly becoming more prevalent in the industry.

Multithreading enables multitasking within a single program. It allows multiple streams (or threads) of execution to take place concurrently within the same program. Each thread may process a different transaction. In order for a multithreaded program to be of any value, it must be run in a multitasking or multiprocessing environment, which allows multiple operations to take place at the same time. The real performance advantage of multithreading becomes apparent where one of the threads is held up waiting for data to arrive and the other threads can continue running. This efficiency alone can speed up today's database and web server systems three to five-fold. In off-the-shelf multi threading (offering operating) system packages (such as Windows NT, Windows 2000, Solaris, and alike), multiple threads may be created and executed within the same process. Multithreaded systems are more frequently used as a server in a client-server environment to provide uninterrupted and responsive services.

Another technique related to multithreading which is becoming more prevalent is preemptive multitasking. Preemptive multitasking enables the sharing of the processing time amongst running programs. Each running program may be assigned a recurring slice of time from the CPU. Depending on the operating system, this time slice may be the same for all programs or it may be adjustable. For example, a modem or network program may be assigned continuous processing slices to be able to process the incoming data stream without loss of data.

With the advantages of preemptive multitasking systems comes a cost associated with predicting where a system has left off its operations when a fault occurs. To ensure continuous provision of service to a client, it is imperative that a secondary system takes over the operations of a faulty system as quickly as possible. Generally, when hardware replication is used to provide system fault tolerance, two identical servers operate simultaneously in parallel to one another within a network. To provide for a mirrored operation of a computing platform, the states between two mirrored computers need to be copied. Given the fact that the two computers execute software, if given the same inputs, the two computers will produce exactly the same output. The problem arises in the duplication of the inputs to the computer. Inputs such as network, keyboard, and mouse are easily duplicated but in a system where the operating system is preemptive the duplication of the preemption point is difficult to mirror exactly. As a result, these systems are incapable of dealing with preemptive multitasking systems that are readily available off-the-shelf and forego the benefits associated therewith.

One solution is to avoid using a preemptive operating system altogether and forego all benefits of such a system. Alternatively, one can use an operating system specifically designed for state mirroring without utilizing the available off-the-shelf systems and all their benefits (such as cost savings, customer support, and the like). Accordingly, there are significant costs associated with provision of fault-tolerant systems based on the current designs, partly, because these systems require use of proprietary software and/or hardware.

BRIEF DESCRIPTION OF DRAWINGS

The present invention may be better understood and it's numerous objects, features, and advantages made apparent to those skilled in the art by reference to the accompanying drawings in which.

The use of the same reference symbols in different drawings indicates similar or identical items.

DETAILED DESCRIPTION OF INVENTION

Figure 1A:
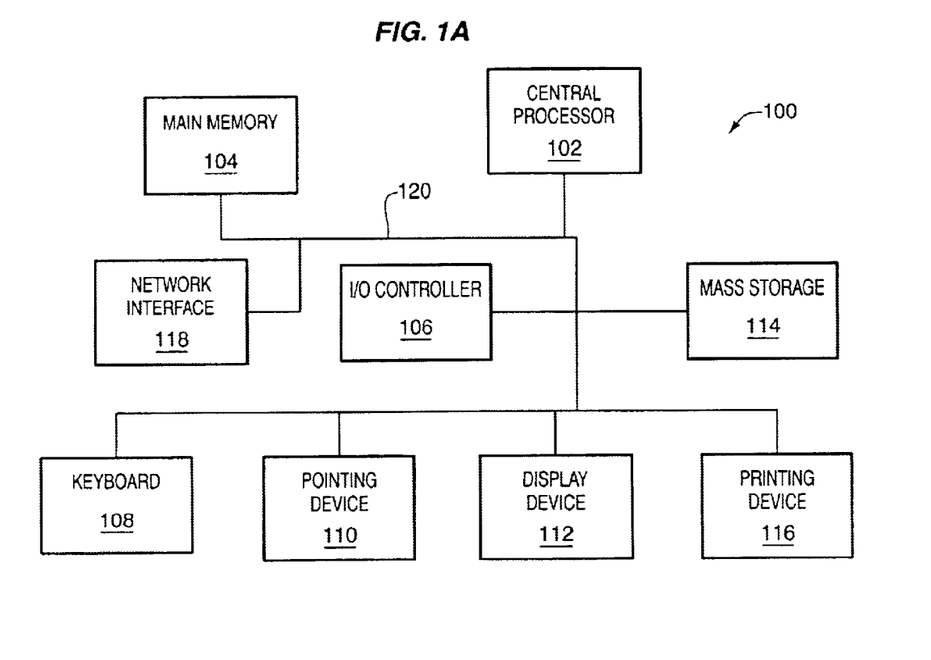
FIG. 1A illustrates an exemplary computer system 100 in which the present invention may be embodied.

FIG. 1A illustrates an exemplary computer system 100 in which the present invention may be embodied in certain embodiments. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., hard disk, optical drive, or the like), and a network interface 118. Additional input/output devices, such as a printing device 116, may be included in the system 100 as desired. As illustrated, the various components of the system 100 communicate through a system bus 120 or similar architecture. In a preferred embodiment, the computer system 100 includes an IBM-compatible personal computer utilizing an Intel microprocessor, which is available from several vendors (including IBM of Armonk, N.Y.). Those with ordinary skill in the art understand that any type of computer system may be utilized to embody the present invention, including those made by Sun Microsystems and Hewlett Packard, both of Palo Alto, Calif. Also, instead of a single processor, two or more processors can be utilized to provide speedup in operations. The network interface 118 provides communication capability with other computer systems on a same local network, on a different network connected via modems and the like to the present network, or to other computers across the Internet. In various embodiments, the network interface 118 can be implemented in Ethernet, Fast Ethernet, Gigabit Ethernet, wide-area network (WAN), leased line (such as T1, T3, optical carrier 3 (OC3), and the like), digital subscriber line (DSL and its varieties such as high bit-rate DSL (HDSL), integrated services digital network DSL (IDSL), and the like), time division multiplexing (TDM), asynchronous transfer mode (ATM), satellite, cable modem, Universal Serial Bus, and FireWire.

Figure 1B:
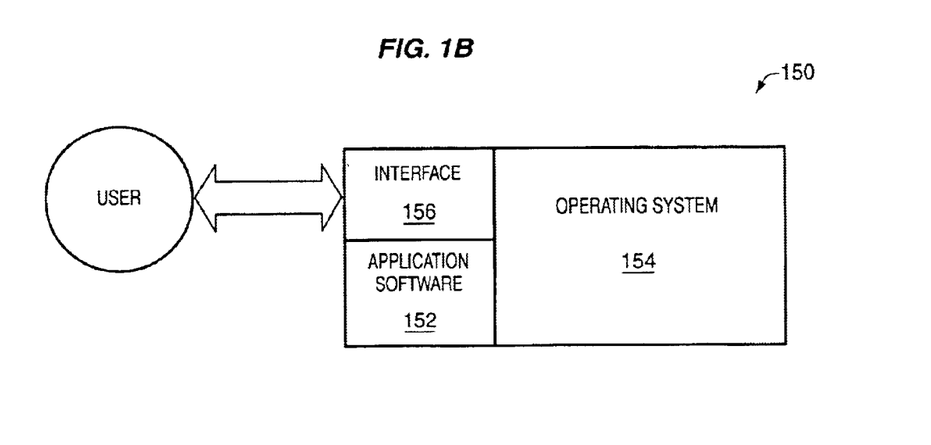
FIG. 1B illustrates an exemplary computer software system 150 provided for directing the operation of the computer system 100 in accordance with an embodiment of the present invention.

FIG. 1B illustrates an exemplary computer software system 150 provided for directing the operation of the computer system 100 in accordance with an embodiment of the present invention. The software system 150, which can be stored in the main memory 104 and/or on the mass storage 114, includes a kernel or operating system 154 and a shell or interface 156. One or more application programs, such as application software 152, maybe "loaded" (i.e., transferred from the mass storage 114 into the main memory 104) for execution by the system 100. The system 100 can receive user commands and data through the interface 156 and/or the network interface 118. These inputs may then be acted upon by the system 100 in accordance with instructions from the operating system 154 and/or application software 152. The interface 156, which is preferably a graphical user interface (GUI), also serves to display results, whereupon the user may supply additional inputs or terminate a session for example. In an embodiment, the operating system 154 can be Microsoft Windows NT (and its relatives such as Windows 2000, XP, ME, and the like), Solaris, HP-UX, Unix, Berkeley software distribution (BSD) Unix, Linux, VxWorks, qSOS, QNX, Apple Unix (AUX), and the like. The application module 152 can include any type of generic binary applications, such as those available from companies including Oracle, Siebel, Unisys, Microsoft, Adobe, Netscape, and the like.

Figure 2:
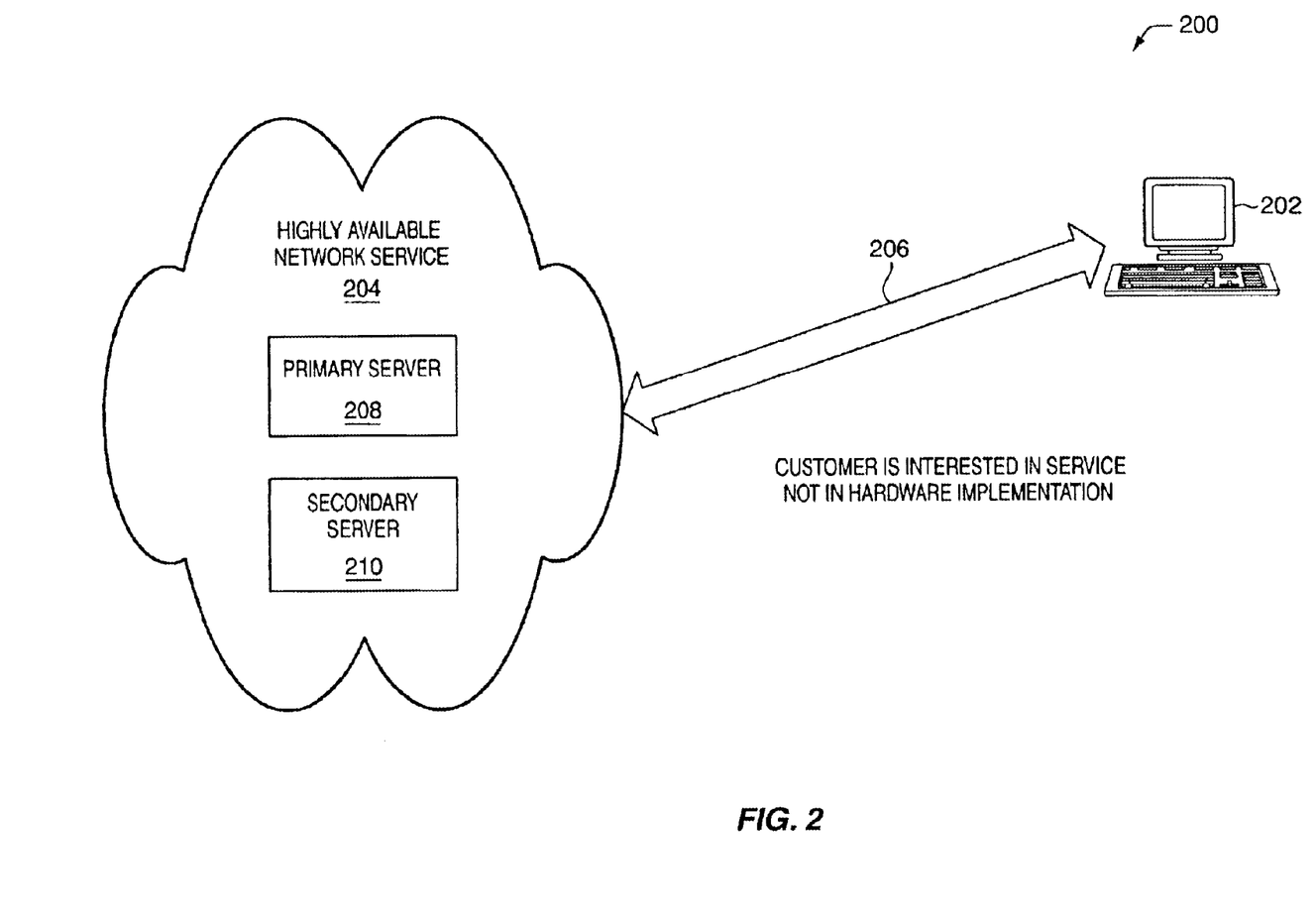
FIG. 2 is a simplified block diagram of a system 200 in accordance with an embodiment of the present invention for provision of fault-tolerant services.

FIG. 2 is a simplified block diagram of a system 200 in accordance with an embodiment of the present invention. The system 200 includes a customer computer 202, which is linked to a highly available network service 204 via a link 206. The highly available network service 204 can include a primary server 208 and a secondary server 210. It is envisioned that the customer computer 202 is primarily interested in services provided by highly available network service 204 and not in its hardware implementation. The customer computer can be any type of personal computer (IBM compatible, Macintosh, and the like), handheld device (running Palm OS, Windows CE, and the like), wireless device, and the like. The link 206 can be any type of wired or wireless connection available to those with ordinary skills in the art (including those mentioned throughout the present application). The servers 208 and 210 can be selected from any of the common server platforms such as Microsoft Windows NT (and its relatives such as Windows 2000, XP, ME, and the like), Solaris, HP-UX, Unix, BSD, Linux, VxWorks, pSOS, QNX, AUX, and the like.

Figure 3:
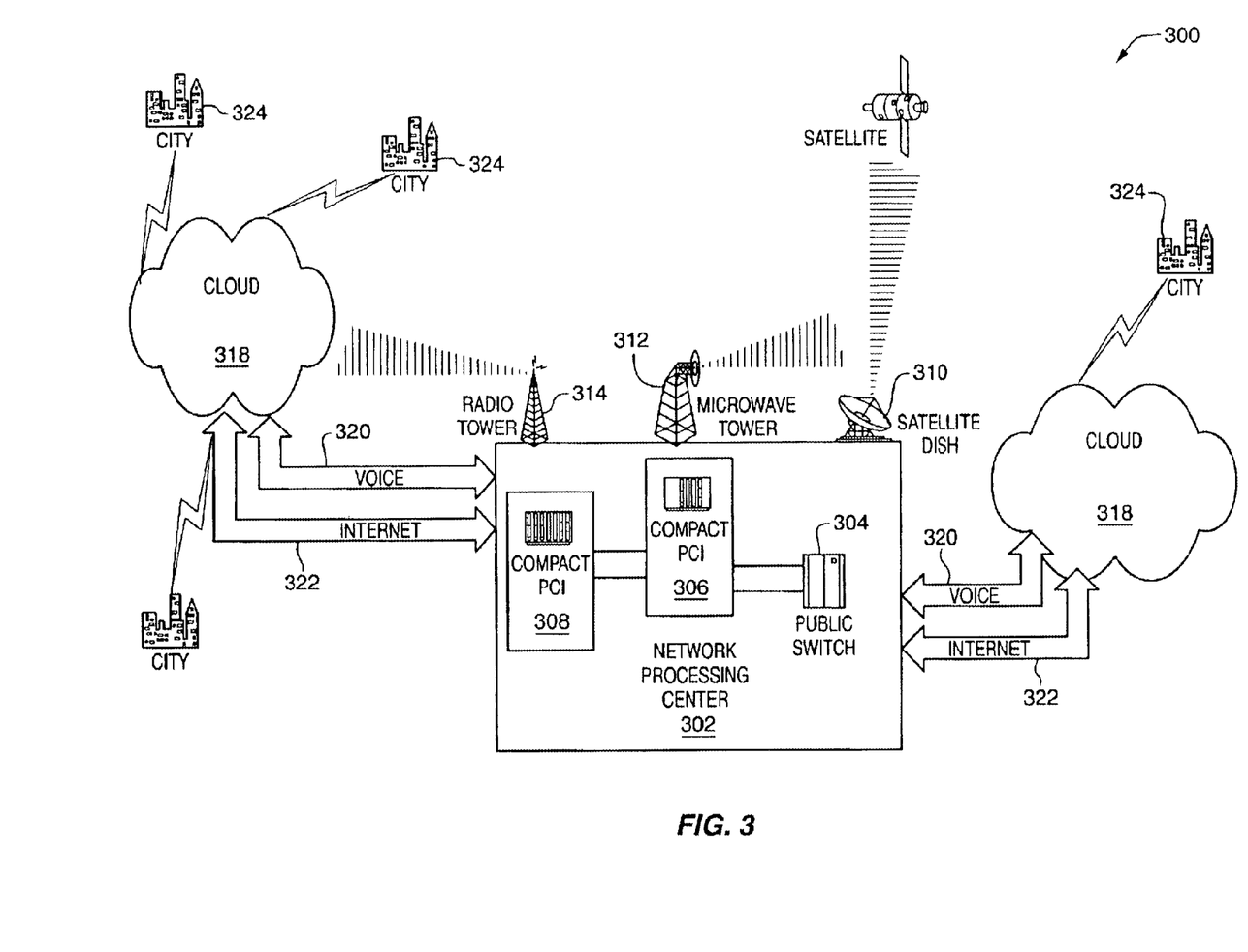
FIG. 3 illustrates a simplified block diagram of a system 300 in accordance with an embodiment of the present invention.

FIG. 3 illustrates a simplified block diagram of a system 300 in accordance with an embodiment of the present invention. A network-processing center 302 includes a public switch 304, servers 306 and 308 (in some embodiments, with compact peripheral component interconnect (cPCI) connections), satellite dish 310, microwave tower 312, and radio tower 314. The network-processing center 302 is coupled to clouds 318 via voice connections 320 and/or Internet connections 322 to cities 324. The satellite dish 310 can communicate with a satellite 316. In accordance with an embodiment of the present invention, customers located in cities 324 may communicate with the network-processing center 302 via voice connections, Internet connections, and/or wireless connections (e.g., through the satellite 316 and/or microwave tower 312).

The network-processing center 302 can communicate with other network processing centers (not shown via voice, Ethernet, satellite, microwave, and radio connections). It is envisioned that the radio signals transmitted from the radio tower 314 can also facilitate wireless communications between customers and the network-processing center 302. Of course, customers may be located anywhere and are not restricted to be in a city 324. For example, customers may utilize satellite communications such as those provided by DIRECT TV or Dish Network anywhere in the world.

Figure 4:
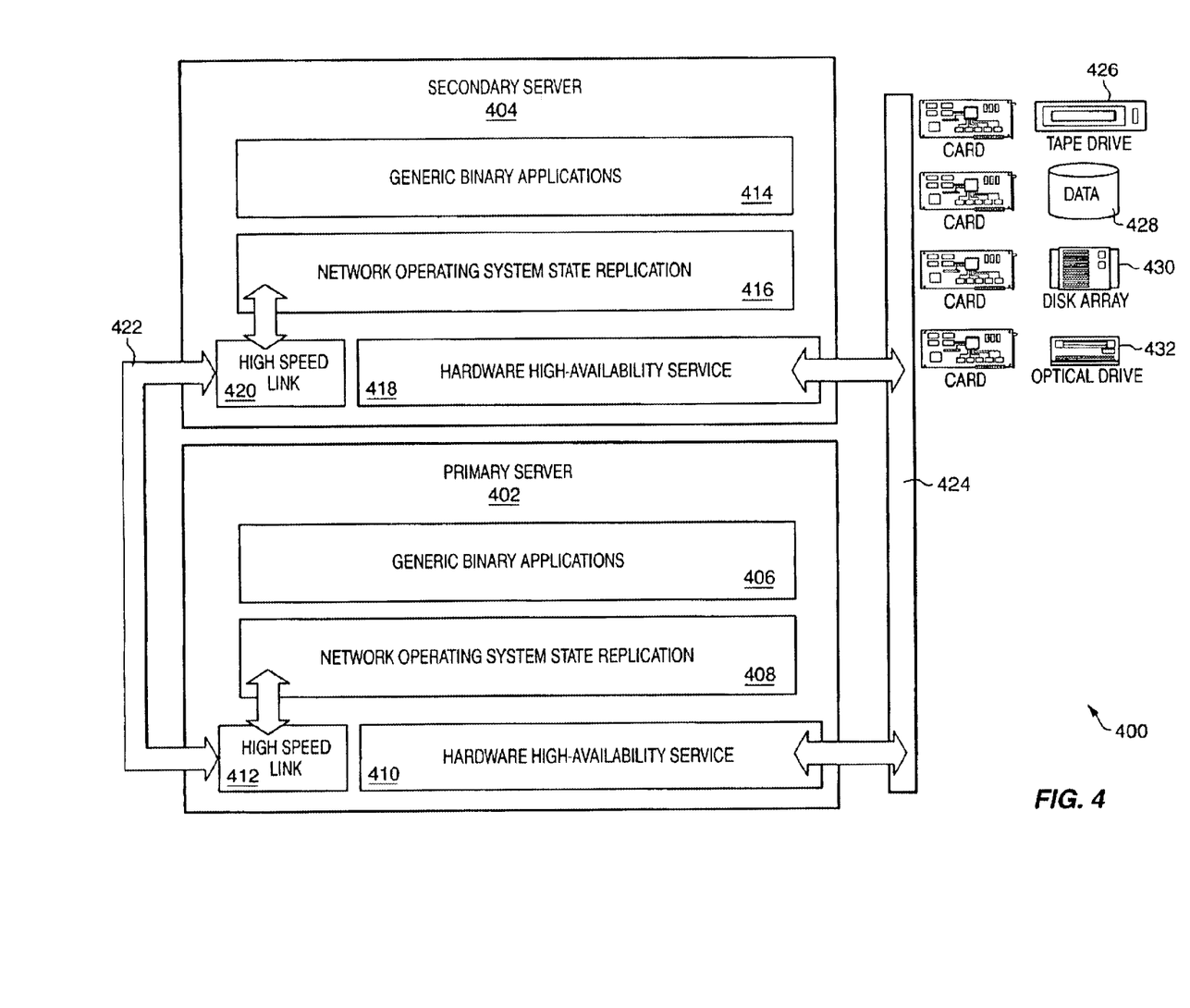
FIG. 4 illustrates a simplified block diagram of a system 400 in accordance with an embodiment of the present invention for provision of fault-tolerant services.

FIG. 4 illustrates a simplified block diagram of a system 400 in accordance with an embodiment of the present invention. The system 400 includes a primary server 402 and a secondary server 404. The primary server 402 includes generic binary applications 406, network operating system state replication 408, hardware high availability service 410, and high speed link 412. Similarly, the secondary server 404 includes generic binary applications 414, network operating system state replication 416, hardware high availability service 418, and high speed link 420. The primary server 402 and the secondary server 404 can be coupled via high speed link 422. The primary server 402 and secondary server 404 may also be coupled via a shared bus configuration 424 which would provide access to, for example, a tape drive 426, data storage 428, disk array 430, and/or optical drive 432 through the hardware high-availability services 410 and 418.

The hardware high-availability services 410 and 418 provide access to the devices mentioned above by, for example, providing error-free communication through use of high-speed communications devices such as Gigabit Ethernet cards, Firewire, or USB. The hardware high-availability services 410 and 418 can be selected from available products such as Microsoft IIS, Apache web server, Oracle database, and the like.

It is envisioned that the shared bus configuration 424 may provide access to other types of resources shared between the primary server 402 and the secondary server 404. Additionally, the generic binary applications 406 and 408 can be any type of application that customarily is run on a server. Examples would include any type of binary application including those provided by Oracle, Siebel, Unisys, Microsoft, Redhat, and the like. It is also envisioned that the generic binary applications 414 and 406, the network operating system state replications 416 and 408, hardware high availability services 410 and 418, and high speed links 420 and 412 maybe identical, respectively.

The high speed link 422 can be a link selected from a group comprising PCI, cPCI, Infiniband, Gigabit Ethernet, 10/100 Mb Ethernet, Token Ring, fiber, wireless, universal serial bus (USB), microwave, broadband, digital subscriber line (DSL) (and it's variety such as IDSL), cable modem, OC3, TDM, asynchronous transfer mode (ATM), satellite, FireWire, and the like.

Accordingly, as long as the high speed link 422 can provide a communication bandwidth of about 10 Mbps or more, any type of communication system can provide the high speed link between the primary and secondary servers. The primary and secondary servers may also be installed remotely. In a remote type of configuration the shared bus configuration 424 may be selected from any type of bus structure such as those mentioned with respect to the high speed link 422. The hardware availability services 410 and 418 provide hardware services between the primary and secondary servers 402 and 404 and the shared bus configuration 424. The generic binary applications 406 and 414 can be selected from any group of applications such as data base programs and web server type applications.

Moreover, it is envisioned that the generic binary applications are not necessarily modified to implement embodiments of the present invention and can be any type of available binary applications off-the-shelf. The high speed links 412 and 420 communicate with the network operating system state replication 408 and 416 to provide a fault-tolerant system wherein if a primary server fails a secondary server will take over the execution of the generic binary applications without loss of data or noticeable delay.

Figure 5:
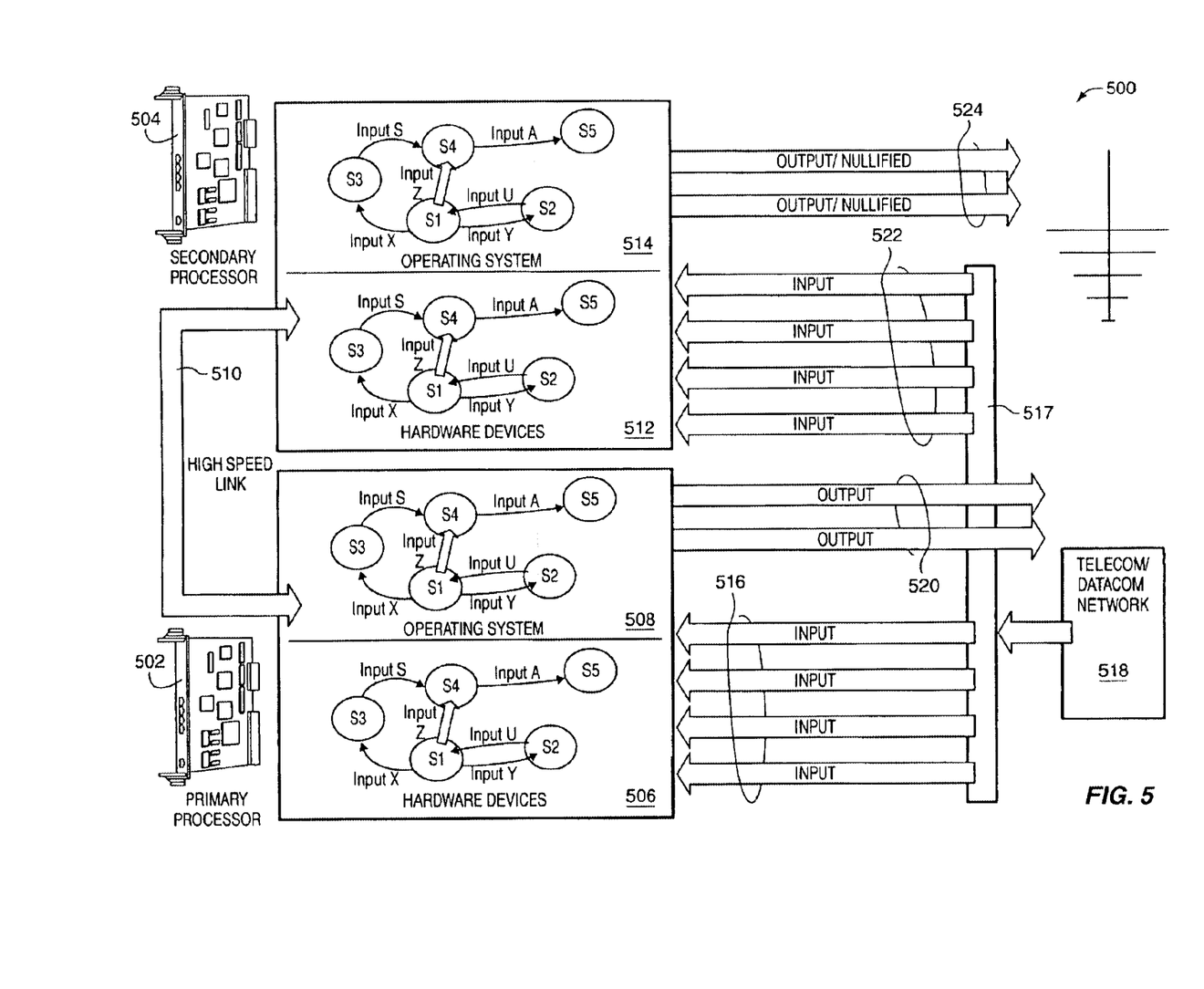
FIG. 5 illustrates a simplified block diagram of a system 500 in accordance with an embodiment of the present invention.

FIG. 5 illustrates a simplified block diagram of a system 500 in accordance with an embodiment of the present invention. The system 500 includes a primary processor 502 and a secondary processor 504. Each of these processors provides processing power to hardware devices, which are controlled by their respective operating systems. For example, the primary processor 502 provides processing power to hardware devices 506 and operating system 508. Similarly, the secondary processor 504 provides processing power to hardware devices 512 and operating system 514. FIG. 5 also illustrates five states for each of the hardware devices and operating systems shown. These states will be discussed in more detail with respect to FIG. 6. The primary and secondary processors 502 and 504 can communicate via a high speed link 510. The high speed link 510 can and in some embodiments be the same high speed link as that discussed with respect to FIG. 4 (422).

The hardware devices 506 and 512 are configured to receive inputs 516 and 522, respectively, from telecom/datacom network 518 via a shared bus configuration 517. It is envisioned that in certain embodiments the shared bus configuration 517 is identical to that discussed with respect to FIG. 4 (424). As illustrated in FIG. 5, the output 520 from, for example, the hardware devices 506 is provided to the telecom/datacom network 518. Contrarily, an output 524 provided by, for example, the hardware devices 512 are nullified.

Figure 6:
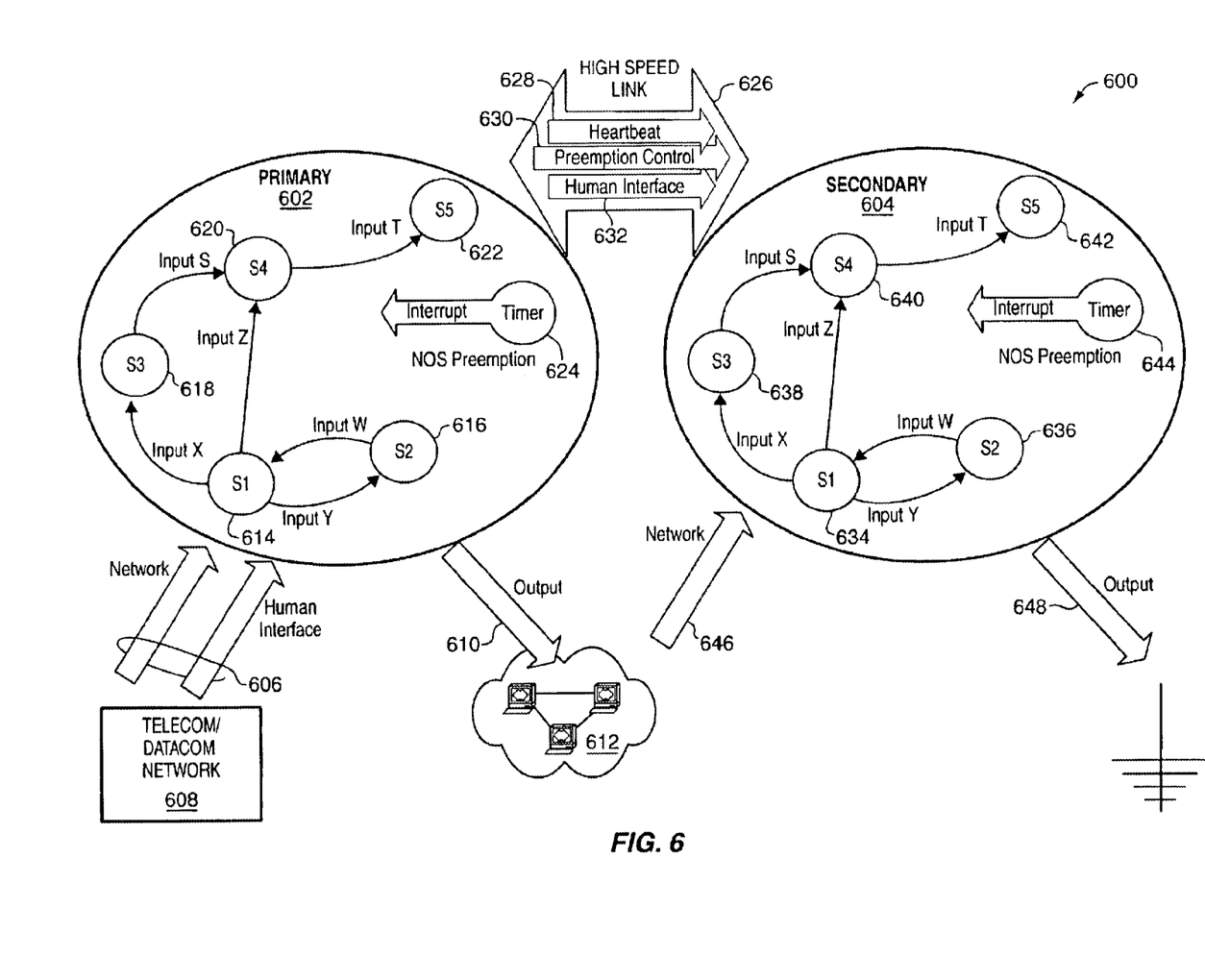
FIG. 6 illustrates a simplified block diagram of a system 600 in accordance with an embodiment of the present invention, which illustrates the state of a system in its normal operation prior to a failure occurring.

FIG. 6 illustrates a simplified block diagram of a system 600 in accordance with an embodiment of the present invention. The system 600 illustrates the state of a system in its normal operation prior to a failure occurring. The system 600 includes a primary system 602 and a secondary system 604. The primary system 602 receives inputs 606 from a telecom/datacom network 608. The inputs may include network and/or human interface data. The primary system 602 is represented as a state machine having states 614 through 622. For example a state 614 (S1) receives input W from the state 616 (S2) and outputs an input Y to the state 616 (S2). As illustrated the state 614 provides inputs X and Z to states 618 and 620, respectively. The state 618 provides input S to the state 620. The state 620 provides input T to the state 622. Of course, the state configurations shown in FIG. 6 are merely for exemplarily purposes and those ordinary skill in the art would understand that any type of state configuration may be utilized.

The primary system 602 further includes a timer 624 which can be configured to provide an interrupt to the primary system 602. This interrupt may be utilized to provide preemption in, for example, a network operating system. The primary system 602 provides its output 610 to a cloud of users 612. The secondary system 604 includes similar states to the primary system (634–642) and a timer 644. The secondary system 604 is configured to receive input 646 from, for example, a network. Output 648 the secondary system 604 is nullified in some embodiments of the present invention. The primary system 602 and secondary 604 can be coupled via high speed links 626. The high speed links 626 may provide information including heart beat 628, preemption control 630, and human interface 632. The heartbeat 628 can be utilized to inform the secondary system 604 that the primary system 602 is up and running. The preemption control 630 can inform the secondary system 604 about preemption event occurring within the primary system 602. The human interface 632 can provide human interface information or data information to the secondary system 604 because in certain configurations of the present invention, such as that shown in FIG. 6, the primary system 602 is configured to receive the human interface data only.

Figure 7:
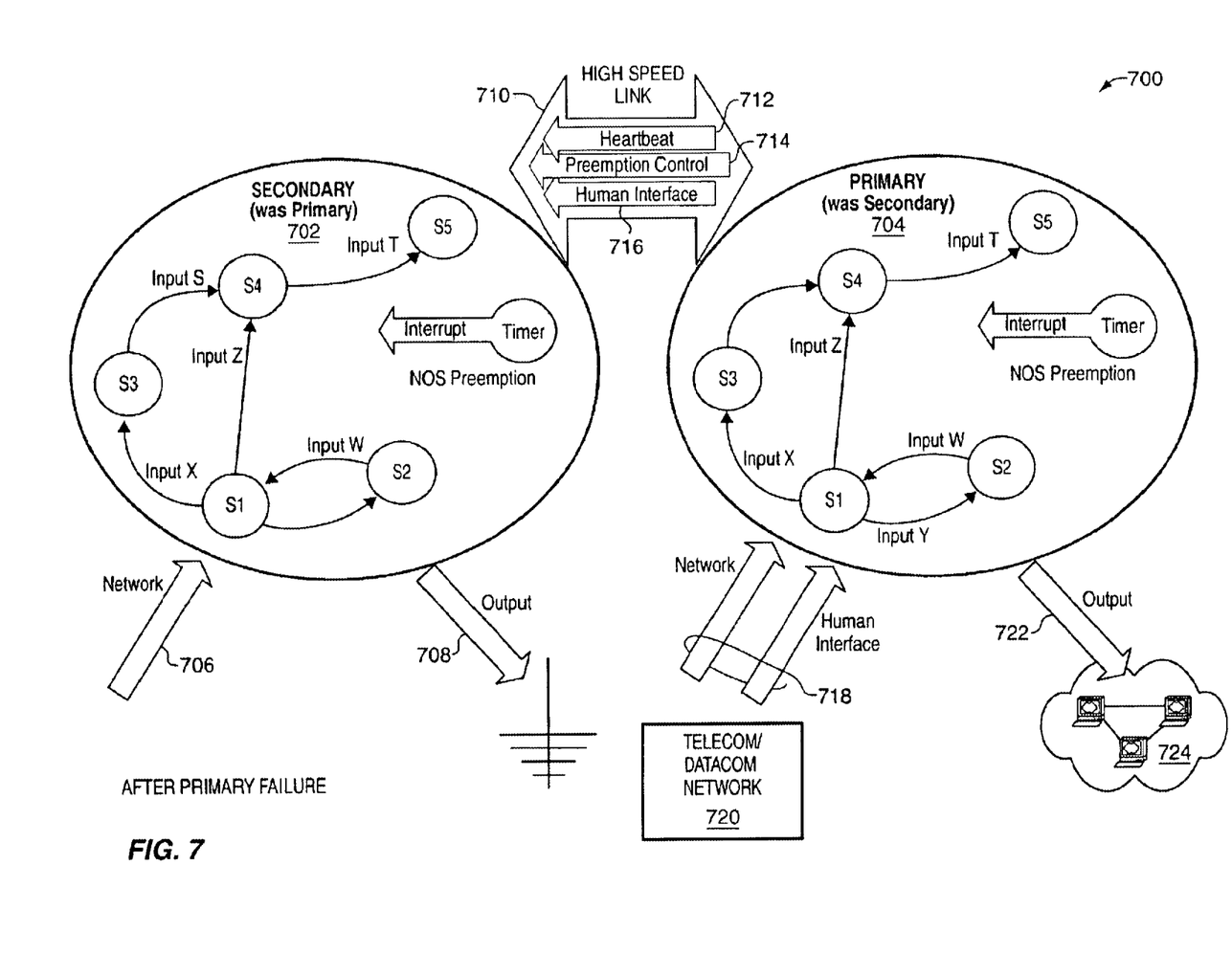
FIG. 7 illustrates a simplified block diagram of a system 700 in accordance with an embodiment of the present invention, which illustrates the state of system 600 of FIG. 6 after a failure within the primary system 602 has occurred.

FIG. 7 illustrates a simplified block diagram of a system 700 in accordance with an embodiment of the present invention. The system 700 illustrates the state of the system 600 of FIG. 6, after a failure within the primary system 602 has occurred. As shown in FIG. 7, systems 702 and 704 correspond to systems 602 and 604 of FIG. 6, respectively. In particular, the primary system 602 becomes the secondary system 702 and the secondary system 604 becomes the primary system 704 after a failure occurres within the system 600. As indicated, after a failure the secondary system 702 receives input 706 which can be equivalent to the input 646 of FIG. 6 and the primary system 704 receives inputs 718 which are equivalent to inputs 606 of FIG. 6 from a telecom/datacom network 720, which in some embodiments is equivalent to the telecom/datacom network 608 of FIG. 6. Similarly, the secondary system 702 has nullified output 708 (equivalent to the output 648 of FIG. 6). And, the primary system 704 provides its output 722 (equivalent to the output 610 of FIG. 6) to a cloud of computers 724. It is envisioned that the cloud of computer 612 of FIG. 6 is equivalent to a cloud of computer 724 of FIG. 7. As a result of the switch over between the primary and secondary systems, the cloud of computers will see no noticeable interruption of service. A high speed link 710 provides heartbeat 712, preemption control 714, and human input 716 from the primary systems 704 to the secondary system 702. The high speed link 710 is envisioned to be substantially equivalent in certain embodiments of the present invention to the high speed link 626 of FIG. 6. The high speed links discussed with respect to FIGS. 6 and 7 can be selected from any of the solutions available to those with ordinary skill in the art in addition to those discussed herein (such as those discussed with respect to FIGS. 1 to 5).

Figure 8:
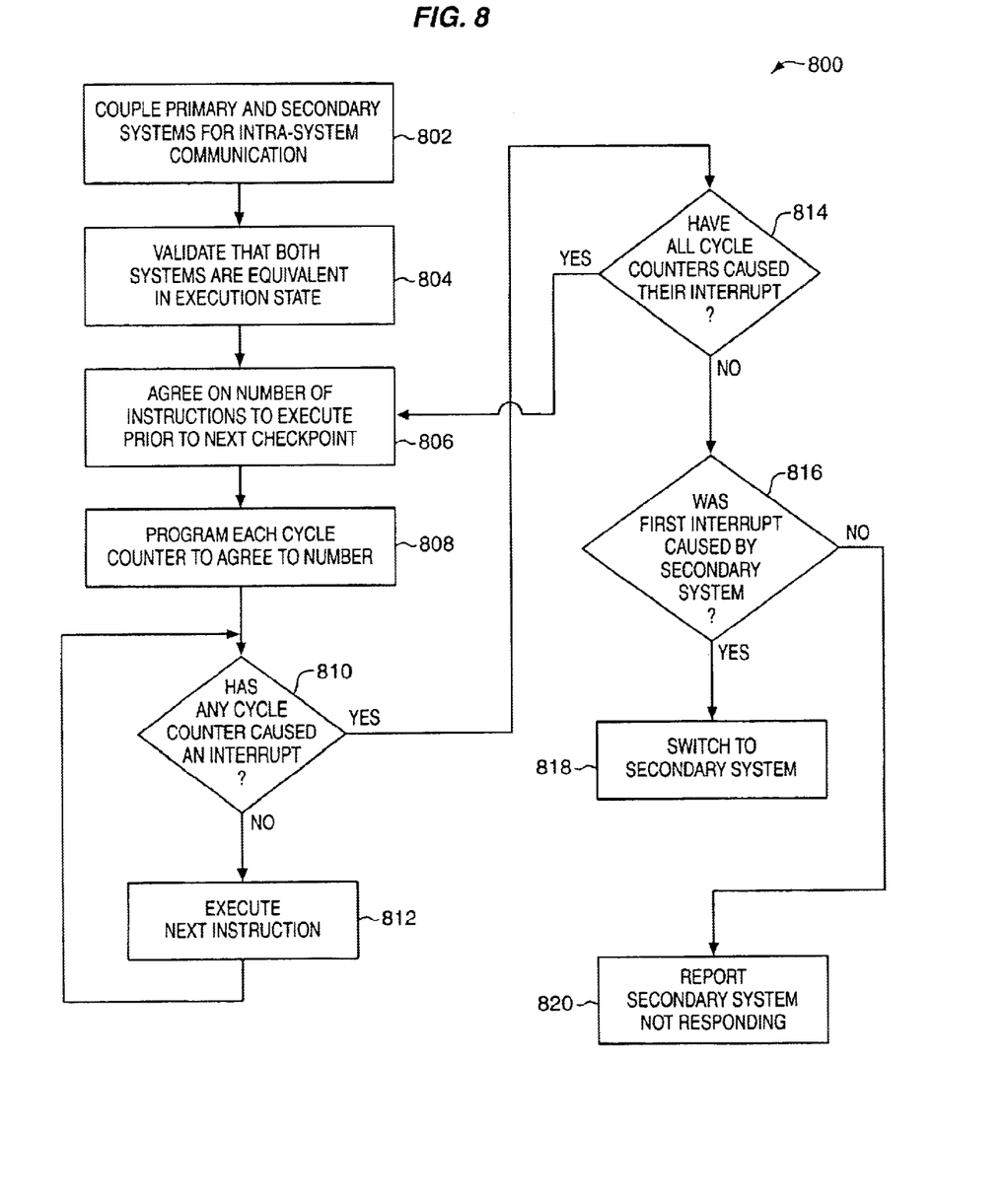
FIG. 8 is a simplified block diagram of a method 800 in accordance with an embodiment of the present invention.

FIG. 8 is a simplified block diagram of a method 800 in accordance with an embodiment of the present invention. In step 802, a primary system and a secondary system are coupled for inter-system communication. In a step 804, it is validated whether both the primary and secondary systems are equivalent in execution state. In certain embodiments, the step 804 would include waiting for the primary and secondary systems to boot up and load their operating systems (or otherwise initialize). The step 804 may also involve waiting for a binary application to load up on each of the primary and secondary systems. In a step 806, the primary and secondary systems agree on the number of instructions to execute prior to a next checkpoint. The actual number of instructions to be executed may depend on a variety of items including the operating system, the connection type between the two systems, the hardware involved, networking connections, type of applications running on the systems, and the like.

Moreover, in an embodiment, it is envisioned that to provide an optimized solution a ratio between the CPU speed and the high speed link speed be maintained. For example, if the CPUs are fairly slow (e.g., 100 MHz) and the preemption points are 100 times a second that means that the link could provide a bandwidth of 10 Mbps since the synchronization is done every 1 MHz. Most CPUs today are however much faster (i.e., 1 Ghz+), so having a speed of at least a 100 Mbps for the communication link is envisioned for some embodiments. Those with ordinary skill in the art, having had the benefits of the teachings of the present disclosure, will understand that a more frequent check pointing technique may involve additional overhead which may in turn slow down the normal operation of the systems involved.

There may also be costs associated with having a different preemption interval schemes than those supported by individual operating systems. For example, an IBM system may only have preemption points at eighteen (18) times per second whereas a Solaris system may have preemption points at one thousand (1000) per second. In a step 808, each cycle counter is programmed to the agreed to number of instructions. In a step 810, it is determined whether any cycle counter has caused an interrupt. It is envisioned that prior to the step 810 a number of instructions may be executed. If no interrupt has been caused by any cycle counter in a step 812, a next instruction is executed. It is envisioned that in the step 812 more than one instruction may be executed. After performing the step 812 the method 800 returns to the step 810 to test whether any cycle counters have caused an interrupt. If the answer to the test at step 810 is "yes," then in a step 814 it is determined whether all cycle counters have caused there interrupts. If the step 814 returns a "yes," then the method 800 resumes its operation at the step 806. If the answer to the test 814 is "no," in a step 816 it is determined whether the first interrupt was caused by the secondary system. If the first interrupt was caused by the secondary system then in a step 818 the operation of the fault-tolerant system is switched to the secondary system. Once the step 818 is reached, the method 800 may also send a message out to indicate that the primary system may not be operating correctly.

Alternatively, if the step 816 determines that the first interrupt was caused by the primary system only, in a step 820 a message can be sent that the secondary system is not responding. In certain embodiments of the present invention, it is envisioned that more than one system may be utilized to provide fault tolerance. For example, three systems may be utilized, a primary, a secondary, and a backup system. Then, if the method 800 informs a system operation center that the secondary system may be down the backup system may be utilized to provide secondary services to the primary system still in operation. It is also envisioned that if one of the primary or secondary systems fail, a backup system may have to be booted up or brought up to the same or equivalent execution state of the still running primary or secondary system (similar to the step 804 of FIG. 8).

The cycle counter referred to herein may be that provided in all Pentium and later processors sold by Intel Corporation of Santa Clara, Calif. In light of the teachings of the present disclosure, those with ordinary skill in the art would understand that a similar counter provided in any microprocessor can be utilized to implement embodiments of the present invention. Examples of other microprocessors supporting this function are XScale made by Intel and PowerPC made by IBM.

Also, in some embodiments, the invention may provide for modification of the kernel source code to support the coordination of the preemption points and use of the cycle counter to provide equivalent preemption points. In such embodiments, an application may run on such a system unmodified.

The foregoing description has been directed to specific embodiments. It will be apparent to those with ordinary skill in the art that modifications may be made to the described embodiments, with the attainment of all or some of the advantages. For example, any communication provided for herein can be encrypted, compressed, or otherwise modified for efficiency and/or security. Examples of security procedures include utilization of virtual private networks (VPNs), advanced encryption standard (AES), pretty good privacy (PGP), Rivest, Shamir, & Adleman (RSA), and secure sockets layer (SSL). Therefore, it is the object of the appended claims to cover all such variations and modifications as come within the spirit and scope of the invention.

What is claimed is:

1. A method of providing a fault-tolerant system comprising:

providing at least two computer systems including a primary system and a secondary system, the primary and the secondary systems each utilizing processors which provide a primary cycle counter and a secondary cycle counter respectively and operating systems capable of preemptive multi-processing;

coupling the primary and secondary systems to enable inter-system communication;

validating that both the primary and secondary systems are equivalent in execution state;

the primary and secondary systems agreeing on a number of instructions to execute prior to a subsequent checkpoint;

programming the primary and secondary cycle counters to the agreed to number of instructions;

executing instructions on both the primary and secondary systems substantially simultaneously, until one of the primary and secondary cycle counters causes a first interrupt;

determining whether both the first interrupt and a second interrupt by a different one of the primary and secondary systems have occurred; and if only the first interrupt has occurred and the first interrupt was caused by the secondary system, providing system output only from the secondary system.

2. The method of claim 1 further including waiting a specified time period for one of the primary and secondary cycle counters to cause the second interrupt.

3. The method of claim 2 wherein the time period is selected from a range between zero to 0.01 second.

4. The method of claim 1 further including sending a message to indicate that the primary system may be down if only the first interrupt has occurred and the first interrupt was caused by the secondary system.

5. The method of claim 1 further including sending a message to indicate that the secondary system may be down if only the first interrupt has occurred and the first interrupt was caused by the primary system.

6. The method of claim 1 wherein only one of the primary and secondary systems provide the system output.

7. The method of claim 1 further including entering high CPU usage state for the primary and secondary systems.

8. The method of claim 1 wherein the inter-system communication is provided through a link selected from a group comprising PCI, cPCI, Gigabit solution, Infiniband, Gigabit Ethernet, 10/100 Mb Ethernet, Token Ring, Fiber, wireless, USB, microwave, broadband, DSL, IDSL, OC 3, TDM, ATM, satellite, Ethernet, cable modem, and FireWire.

9. The method of claim 1 wherein the inter-system communication is provided through a link having a communication bandwidth of about 100 Megabits per second or more.

10. The method of claim 1 wherein the primary and secondary systems are installed remotely.

11. The method of claim 10 wherein the primary and secondary systems communicate via a dedicated link.

12. The method of claim 1 wherein at least one of the primary and secondary systems is implemented as a blade.

13. The method of claim 1 wherein the primary and secondary systems utilize an operating system selected from a group comprising Windows NT, Windows 2000, Windows XP, Solaris, HP-UX, Unix, BSD, Linux, and AUX.

14. The method of claim 1 wherein the inter-system communication is compressed.

15. The method of claim 1 wherein the inter-system communication is encrypted.

16. The method of claim 15 wherein the encryption is provided through a technique selected from a group comprising, VPN, AES, PGP, RSA, and SSL.

17. The method of claim 1 wherein an output is provided to an external system by the primary system until the act of switching services.

18. The method of claim 1 wherein the primary and secondary systems utilize a same type of operating system.

19. The method of claim 1 wherein the primary and secondary systems can each access mass storage.

20. The method of claim 1 wherein the primary and secondary systems can each utilize multiple processors.

21. An apparatus for provision of a fault-tolerant system comprising:
a primary system utilizing a primary cycle counter and an operating system capable of preemptive multi-processing;
a secondary system utilizing a secondary cycle counter and an operating system capable of preemptive multi-processing;
a communication link coupling the primary and secondary systems to enable inter-system communication, the primary and secondary systems agreeing on a number of instructions to execute prior to a subsequent checkpoint through the communication link, the primary and secondary systems executing instructions until one of the primary and secondary cycle counters causes a first interrupt; and
an output facility to provide system output only from the secondary system if only the first interrupt has occurred and the first interrupt was caused by the secondary system.

22. The apparatus of claim 21 further including a messaging facility for sending a message to indicate that the primary system may be down if only the first interrupt has occurred and the first interrupt was caused by the secondary system.

23. The apparatus of claim 21 further including a messaging facility for sending a message to indicate that the secondary system may be down if only the first interrupt has occurred and the first interrupt was caused by the primary system.

24. The apparatus of claim 21 wherein only one of the primary and secondary systems provide the system output.

25. The apparatus of claim 21 wherein the communication link is provided through a link selected from a group comprising PCI, cPCI, Gigabit solution, Infiniband, Gigabit Ethernet, Fast Ethernet, 100 Mb Ethernet, Token Ring, Fiber, wireless, USB, microwave, broadband, DSL, IDSL, OC 3, TDM, ATM, satellite, Ethernet, cable modem, and FireWire.

26. The apparatus of claim 21 wherein the communication link utilizes compression.

27. The apparatus of claim 21 wherein the communication link utilizes encryption.

28. The apparatus of claim 27 wherein the encryption is provided through a technique selected from a group comprising, VPN, AES, PGP, RSA, and SSL.

29. The apparatus of claim 21 wherein the primary and secondary systems utilize an operating system selected from a group comprising Windows NT, Windows 2000, Windows XP, Solaris, HP-UX, Unix, BSD, Linux, and AUX.

30. An apparatus comprising:
a primary system utilizing a primary cycle counter and an operating system capable of preemptive multi-processing;
a secondary system utilizing a secondary cycle counter and an operating system capable of preemptive multi-processing;
coupling means to enable inter-system communication between the primary and secondary systems;
validating means to determine whether both the primary and secondary systems are equivalent in execution state;
programming means for initializing the primary and secondary cycle counters to an agreed to number of instructions;
interruption determining means for determining whether both a first interrupt and a second interrupt by different ones of the primary and secondary systems have occurred; and
output means for providing system output only from the secondary system if only the first interrupt has occurred and the first interrupt was caused by the secondary system.

31. The apparatus of claim 30 further including a messaging facility for sending a message to indicate that the primary system may be down if only the first interrupt has occurred and the first interrupt was caused by the secondary system.

32. The apparatus of claim 30 further including a messaging facility for sending a message to indicate that the secondary system may be down if only the first interrupt has occurred and the first interrupt was caused by the primary system.

33. The apparatus of claim 30 wherein the coupling means is provided through a link selected from a group comprising PCI, cPCI, Gigabit solution, Infiniband, Gigabit Ethernet, 10/100 Mb Ethernet, Token Ring, Fiber, wireless, USB, microwave, broadband, DSL, IDSL, OC 3, TDM, ATM, satellite, Ethernet, cable modem, and FireWire.

34. An article of manufacture comprising:
a machine readable medium that provides instructions that, if executed by a machine, will cause the machine to perform operations including:
providing at least two computer systems including a primary system and a secondary system, the primary and the secondary systems each utilizing processors which provide a primary cycle counter and a secondary cycle counter respectively and operating systems capable of preemptive multi-processing;
coupling the primary and secondary systems to enable inter-system communication;
validating that both the primary and secondary systems are equivalent in execution state;
the primary and secondary systems agreeing on a number of instructions to execute prior to a subsequent checkpoint;
programming the primary and secondary cycle counters to the agreed to number of instructions;
executing instructions on both the primary and secondary systems substantially simultaneously, until one of the primary and secondary cycle counters causes a first interrupt;
determining whether both the first interrupt and a second interrupt by a different one of the primary and secondary systems have occurred; and
if only the first interrupt has occurred and the first interrupt was caused by the secondary system, providing system output only from the secondary system.

35. The article of claim 32 wherein the machine-readable medium further provides instructions that, if executed by a machine, will cause the machine to perform operations including sending a message to indicate that the secondary system may be down if only the first interrupt has occurred and the first interrupt was caused by the primary system.

* * * * *